United States Patent
Liu et al.

(10) Patent No.: US 8,031,311 B2
(45) Date of Patent: Oct. 4, 2011

(54) LIQUID CRYSTAL DISPLAY HAVING ELECTRODES CONNECTED TO CARBON NANOTUBE STRUCTURE

(75) Inventors: Liang Liu, Beijing (CN); Kai-Li Jiang, Beijing (CN); Wei-Qi Fu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 400 days.

(21) Appl. No.: 12/386,407

(22) Filed: Apr. 16, 2009

(65) Prior Publication Data

US 2009/0268139 A1  Oct. 29, 2009

(30) Foreign Application Priority Data

Apr. 25, 2008  (CN) .......................... 2008 1 0066689

(51) Int. Cl.
*G02F 1/1337* (2006.01)
*G02F 1/1333* (2006.01)
*G02F 1/1345* (2006.01)

(52) U.S. Cl. ......... 349/123; 349/161; 349/149; 349/158
(58) Field of Classification Search .................. 349/123, 349/149, 161, 158; 977/742
See application file for complete search history.

(56) References Cited

U.S. PATENT DOCUMENTS

| | | | |
|---|---|---|---|
| 7,045,108 B2 | 5/2006 | Jiang et al. | |
| 2004/0053780 A1 | 3/2004 | Jiang et al. | |
| 2005/0007648 A1 | 1/2005 | Wu et al. | |
| 2006/0113510 A1 | 6/2006 | Luo et al. | |
| 2007/0115413 A1* | 5/2007 | Liu et al. | 349/123 |
| 2007/0296897 A1 | 12/2007 | Liu et al. | |
| 2009/0102810 A1* | 4/2009 | Jiang et al. | 345/173 |
| 2011/0025645 A1* | 2/2011 | Mata et al. | 345/174 |
| 2011/0149373 A1* | 6/2011 | Liu et al. | 359/288 |

FOREIGN PATENT DOCUMENTS

| | | |
|---|---|---|
| CN | 1483667 A | 3/2004 |
| CN | 1955819 A | 5/2007 |
| CN | 1979948 | 6/2007 |
| JP | 2004-107196 | 4/2004 |
| JP | 2004-348121 | 12/2004 |
| JP | 2007-122057 | 5/2007 |
| JP | 2007-314776 | 12/2007 |
| JP | 2008-3606 | 1/2008 |

OTHER PUBLICATIONS

Fan et al., Explorations on growth mechanism, controlled synthesis and applications of carbon nanotubes, Physics, vol. 35, No. 5, pp. 376-381, (2006).

Atomic-beam alignment of inorganic materials for liquid-crystal displays? P. Chaudhari, et al., Nature, vol. 411, p. 56 (2001).

* cited by examiner

*Primary Examiner* — Mike Qi
(74) *Attorney, Agent, or Firm* — Altis Law Group, Inc.

(57) ABSTRACT

A liquid crystal display includes a first substrate, a first alignment layer, a liquid crystal layer, a second alignment layer, and a second substrate opposite to the first substrate, a first electrode and a second electrode. The liquid crystal layer is sandwiched between the first substrate and the second substrate. The first alignment layer is located on the first substrate and face the liquid crystal layer. The second alignment layer is located on the second substrate and face the liquid crystal layer. Furthermore, at least one of the first and second alignment layers comprises a carbon nanotube structure, and the carbon nanotube structure is electrically connected to the first electrode and the second electrode.

20 Claims, 8 Drawing Sheets

LIQUID CRYSTAL DISPLAY HAVING ELECTRODES CONNECTED TO CARBON NANOTUBE STRUCTURE

RELATED APPLICATIONS

This application is related to applications entitled "LIQUID CRYSTAL DISPLAY", filed Apr. 16, 2009 (Ser. No. 12/386,408); "LIQUID CRYSTAL DISPLAY", filed Apr. 16, 2009 Ser. No. 12/386,406). The disclosures of the above-identified applications are incorporated herein by reference. The application is also related to co-pending applications entitled "LIQUID CRYSTAL DISPLAY SCREEN", filed Nov. 20, 2008 (Ser. No. 12/313,452); "LIQUID CRYSTAL DISPLAY SCREEN", filed Nov. 20, 2008 (Ser. No. 12/313,394); "METHOD FOR MAKING LIQUID CRYSTAL DISPLAY SCREEN", filed Nov. 20, 2008 (Ser. No. 12/313,450); "LIQUID CRYSTAL DISPLAY SCREEN", filed Nov. 20, 2008 (Ser. No. 12/313,393); "LIQUID CRYSTAL DISPLAY SCREEN", filed Nov. 20, 2008 Ser. No. 12/313,415; and "LIQUID CRYSTAL DISPLAY SCREEN", filed Nov. 20, 2008 Ser. No. 12/313,440; "METHOD FOR MAKING LIQUID CRYSTAL DISPLAY SCREEN", filed Nov. 20, 2008 (Ser. No. 12/313,414).

BACKGROUND

1. Technical Field

The present disclosure relates to liquid crystal displays and, particularly, to a carbon-nanotube-based liquid crystal display.

2. Discussion of Related Art

A liquid crystal display (LCD) generally includes a first substrate, a second substrate, and a liquid crystal layer. The first substrate is located parallel to the second substrate. The liquid crystal layer including a plurality of liquid crystal molecules is located between the first substrate and the second substrate. A first transparent electrode layer and a first alignment layer are formed on a surface of the first substrate facing toward the liquid crystal layer. A first polarizer is formed on an opposite surface of the first substrate that faces away from the liquid crystal layer. A second transparent electrode layer and a second alignment layer are formed on a surface of the second substrate that faces toward the liquid crystal layer. A second polarizer is formed on an opposite surface of the second substrate that faces away from the liquid crystal layer.

When no voltage is supplied to the liquid crystal display, light can pass through the liquid crystal display. When voltage is supplied, light cannot pass through the liquid crystal display. Thus, when a predetermined voltage is selectively applied to different pixels defined in the liquid crystal display, a picture can be shown.

However, for many reasons, the liquid crystal display cannot perform at low temperature environment. Firstly, since the threshold voltage of the liquid crystal display is related to the temperature, the threshold voltage of the liquid crystal display will increase as the external temperature decreases. A change in the threshold voltage will deteriorate the contrast of the liquid crystal display. Secondly, the viscosity of the liquid crystal molecules in the liquid crystal layer will increase as the external temperature decreases. The liquid crystal molecules become hard to transit its phases and then the response of the liquid crystal display becomes slow.

Conventionally, in order to overcome the above problems, a heating layer can be located on the substrate to increase an operating temperature of the liquid crystal display. The heating layer is usually an indium-tin oxide transparent conductive layer. However, the indium-tin oxide transparent conductive layer is not very efficient for heating and consumes space, which requires that the liquid crystal display be thicker.

What is needed, therefore, is to provide a thin liquid crystal display that can perform at low temperatures.

BRIEF DESCRIPTION OF THE DRAWINGS

Many aspects of the present liquid crystal display can be better understood with reference to the following drawings. The components in the drawings are not necessarily drawn to scale, the emphasis instead being placed upon clearly illustrating the principles of the present liquid crystal display.

Figure 1:
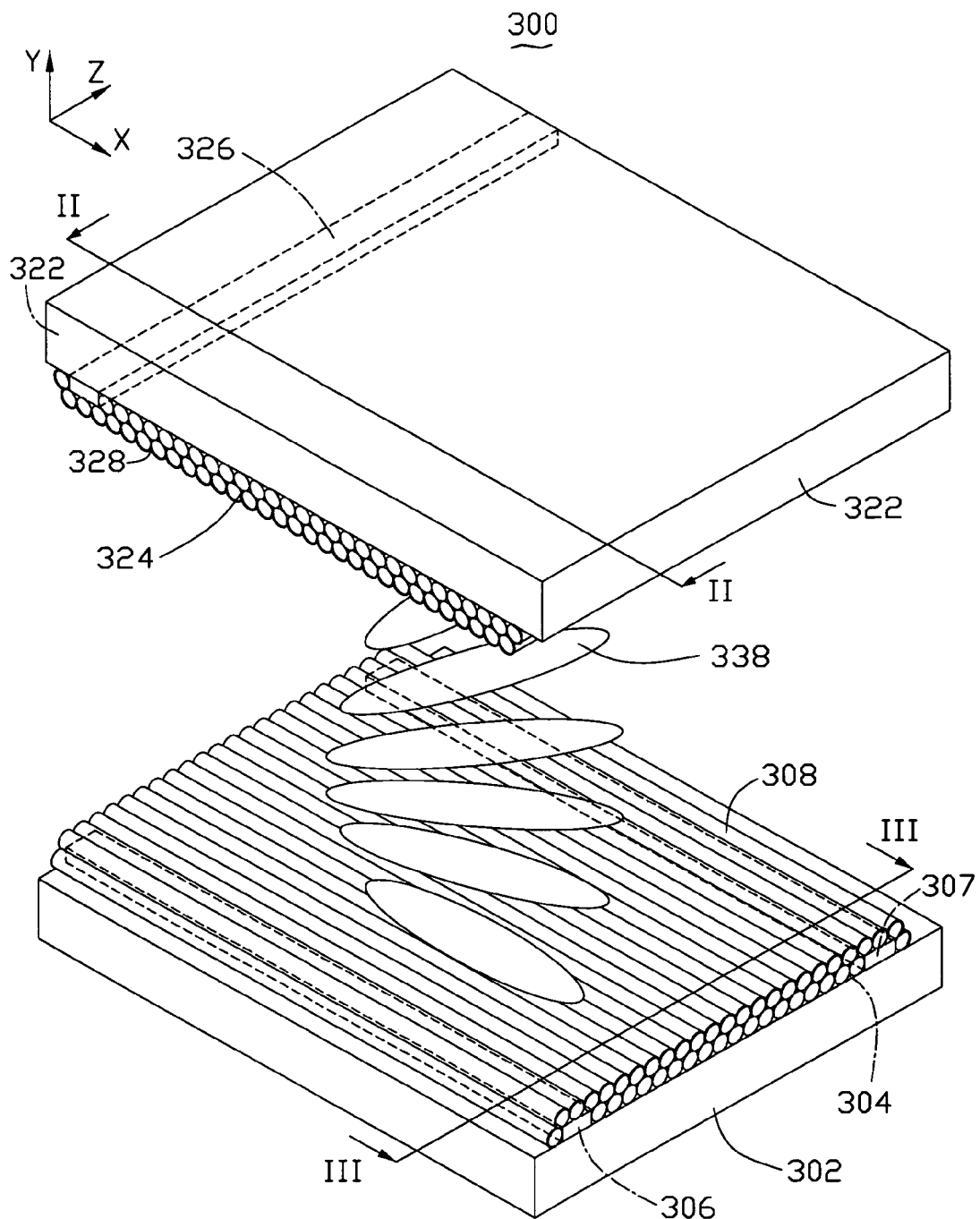
FIG. 1 is a schematic, isometric view of a liquid crystal display in accordance with a first embodiment.

Corresponding reference characters indicate corresponding parts throughout the several views. The exemplifications set out herein illustrate at least one embodiment of the present liquid crystal display, in at least one form, and such exemplifications are not to be construed as limiting the scope of the disclosure in any manner.

DETAILED DESCRIPTION

References will now be made to the drawings to describe, in detail, various embodiments of the present liquid crystal display.

Figure 2:
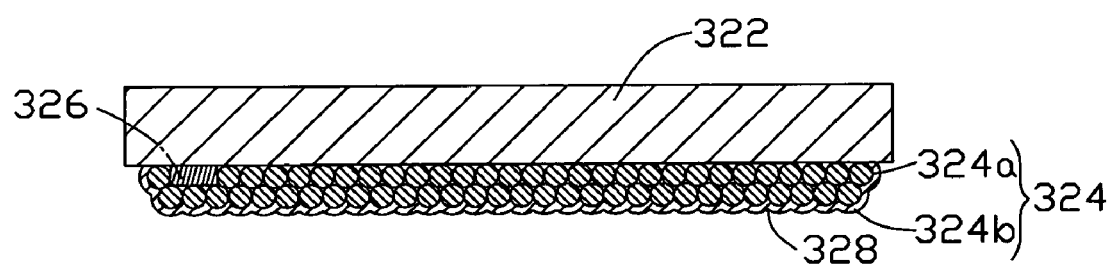
FIG. 2 is a cross-sectional schematic view of the liquid crystal display of FIG. 1, taken along a line II-II.
Figure 3:
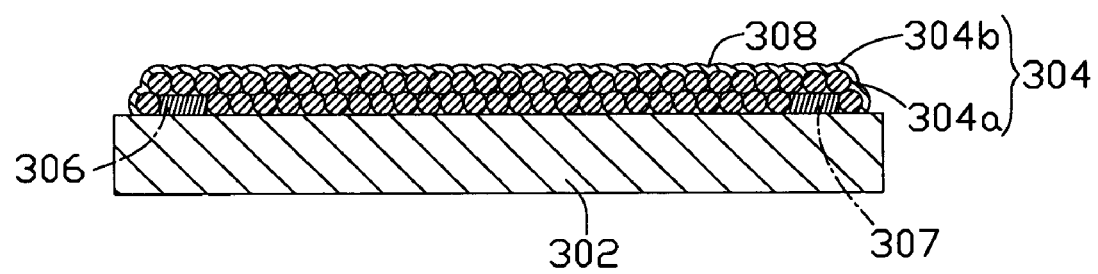
FIG. 3 is a cross-sectional schematic view of the liquid crystal display of FIG. 1, taken along a line III-III.

Referring to FIGS. 1, 2, and 3, a liquid crystal display 300 in the first embodiment includes a first substrate 302, a first alignment layer 304, a liquid crystal layer 338, a second alignment layer 324, and a second substrate 322. The liquid crystal layer 338 is sandwiched between the first substrate 302 and the second substrate 322. The first alignment layer 304 is located on the first substrate 302 adjacent to the liquid crystal layer 338. A plurality of parallel first grooves 308 is defined in a surface of the first alignment layer 304 facing the liquid crystal layer 338. The second alignment layer 324 is located on the second substrate 322 adjacent to the liquid crystal layer 338. A plurality of parallel second grooves 328 is defined in a surface of the second alignment layer 324 facing the liquid crystal layer 338. An alignment direction of the first grooves 308 is perpendicular to an alignment direction of the second grooves 328.

At least one of the first alignment layer 304 and second alignment layer 324 includes a carbon nanotube structure. In the present embodiment, both the first alignment layer 304 and second alignment layer 324 include a carbon nanotube structure.

The carbon nanotube structure in first alignment layer 304 is electrically connected to at least two electrodes. The electrodes are used to supply voltage to the carbon nanotube structure. Furthermore, the carbon nanotube structure in the second alignment layer 324 is electrically connected to at least one electrode. In the present embodiment, the liquid crystal display 300 includes a first electrode 306, a second electrode 307 and a third electrode 326. The first electrode 306 and the second electrode 307 are located separately and electrically connected to the carbon nanotube structure in the first alignment layer 304. The third electrode 326 is electrically connected to the carbon nanotube structure in the second alignment layer 324.

The carbon nanotube structure includes a plurality of carbon nanotubes arranged along the same direction. The carbon nanotubes can be single-walled carbon nanotubes, double-walled carbon nanotubes, multi-walled carbon nanotubes or any combination thereof. Diameters of the single-walled carbon nanotubes range from about 0.5 to about 10 nanometers. Diameters of the double-walled carbon nanotubes range from about 1 to about 50 nanometers. Diameters of the multi-walled carbon nanotubes range from about 1.5 to about 50 nanometers. Each carbon nanotube structures can include one or more carbon nanotube films, or a plurality of carbon nanotube wires.

Figure 4:
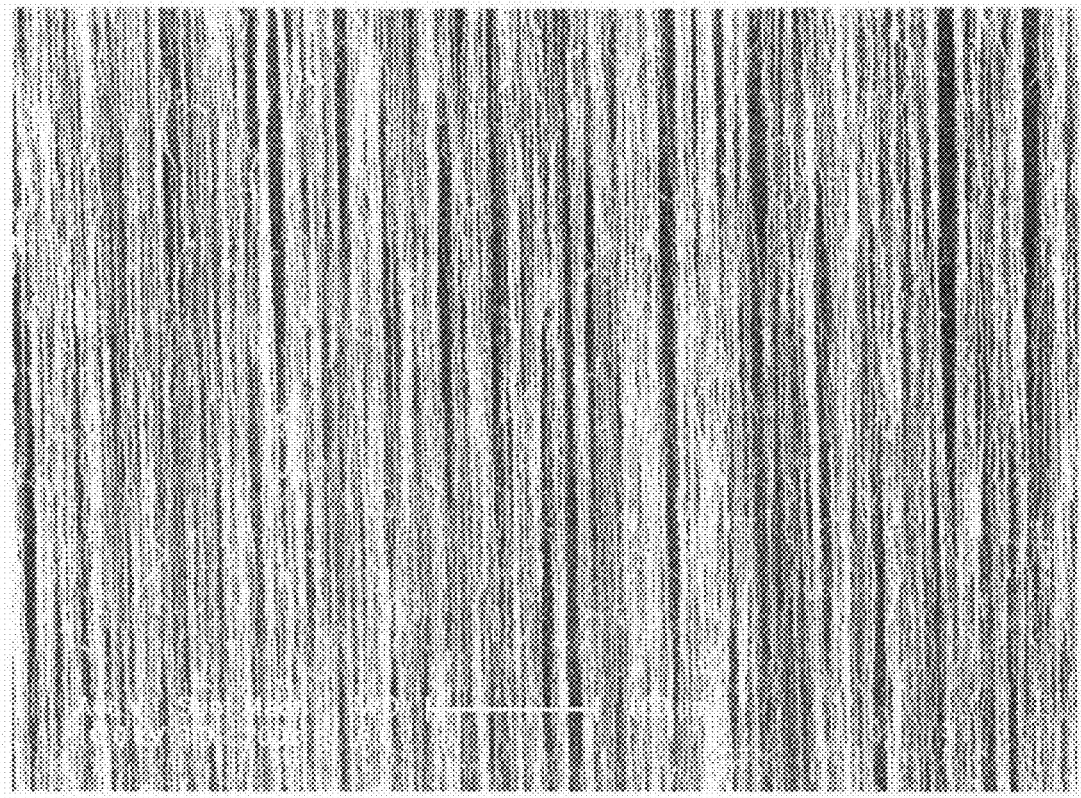
FIG. 4 is a Scanning Electron Microscope (SEM) image of a carbon nanotube film in accordance with the first embodiment.
Figure 5:
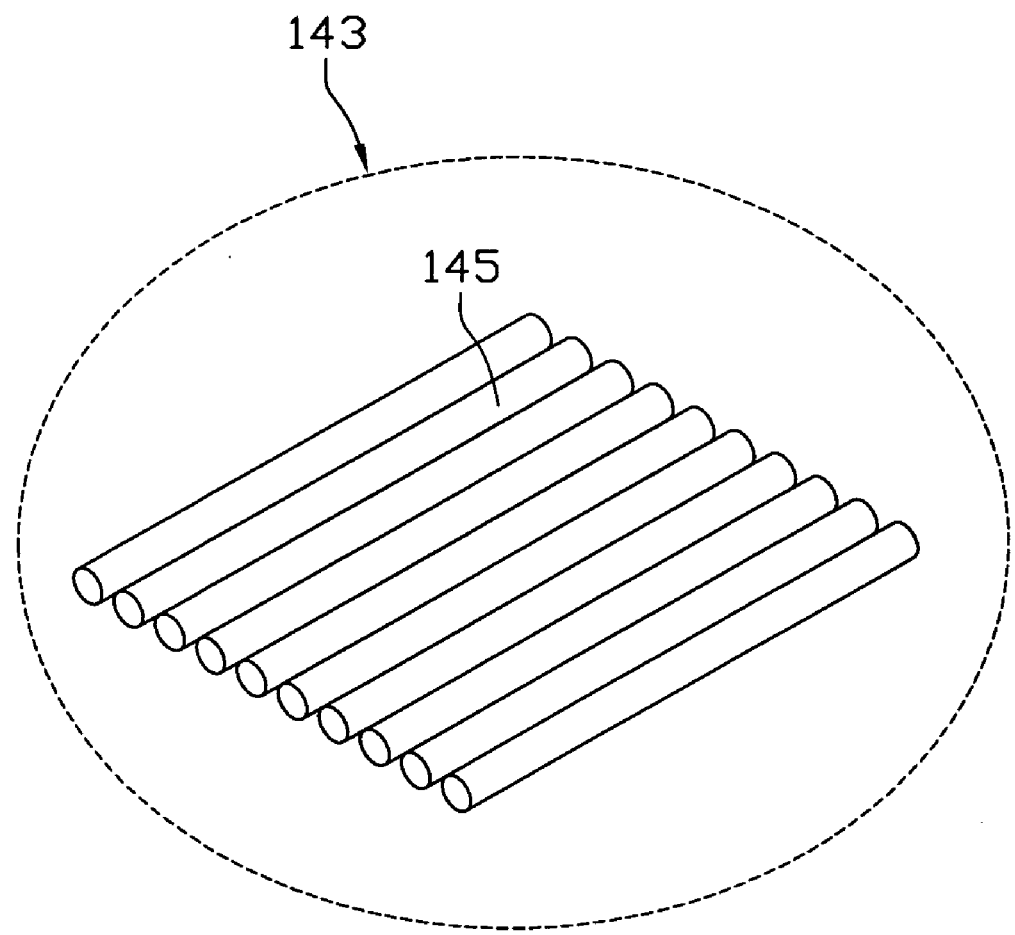
FIG. 5 is a structural schematic view of a carbon nanotube segment of the carbon nanotube film of FIG. 4.

In one embodiment, the carbon nanotube structure includes one carbon nanotube film. Referring to FIGS. 4 and FIG. 5, the carbon nanotube film includes a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the carbon nanotube film 143 are oriented along a preferred orientation.

The carbon nanotube film can be formed by the substeps of: (a) providing a super-aligned carbon nanotube array on a substrate; (b) selecting two or more carbon nanotubes having a predetermined width from the super-aligned array of carbon nanotubes; and (c) pulling the carbon nanotubes to form carbon nanotube segments that are joined end to end. The carbon nanotube segments can be pulled at an uniform speed to achieve a uniform carbon nanotube film. The width and length of the carbon nanotube film is dependent on the size of the carbon nanotube array. In one embodiment, when the substrate is a 4-inch P-type silicon wafer as in the present embodiment, the width of the carbon nanotube film is in a range from about 0.5 nanometers to about 10 centimeters, and the thickness of the carbon nanotube film is in a range from about 0.5 nanometers to about 100 microns. The length of the carbon nanotube film can be larger than about 10 meters.

In other embodiments, the carbon nanotube structures may include at least two stacked carbon nanotube films. Adjacent carbon nanotube films are held in contact with each other by van der Waals attractive force therebetween. An angle α between the preferred orientations of the carbon nanotubes in two adjacent carbon nanotube films is equal to approximately 0 degrees.

Figure 6:
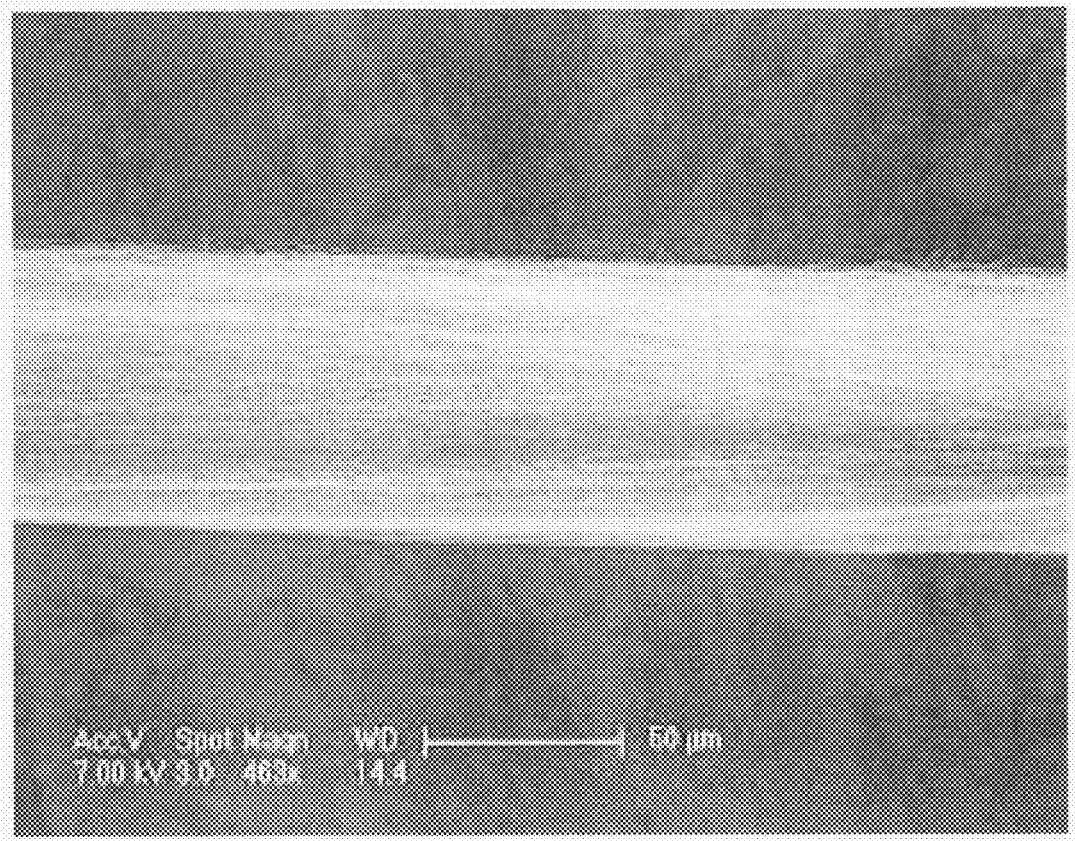
FIG. 6 is a Scanning Electron Microscope (SEM) image of an untwisted carbon nanotube wire in accordance with the first embodiment.

In another embodiment, the carbon nanotube structure may include a plurality of carbon nanotube wires. The carbon nanotube wires are located parallel to each other. The carbon nanotube wire can be in twisted form or in untwisted form. The untwisted carbon nanotube wire is formed by treating the carbon nanotube film with an organic solvent. Specifically, the entire surface of the carbon nanotube film is soaked in volatile organic solvent. After being soaked in the organic solvent, the adjacent parallel carbon nanotubes in the carbon nanotube film will be bundled together because the surface tension of the organic solvent. This causes the carbon nanotube film to shrink into untwisted carbon nanotube wire when the organic solvent vaporizes. Referring to FIG. 6, an untwisted carbon nanotube wire includes a plurality of carbon nanotubes substantially oriented along the same direction (i.e., a direction along the length of the untwisted carbon nanotube wire). Specifically, the carbon nanotubes are substantially parallel to the axis of the untwisted carbon nanotube wire. Length of the untwisted carbon nanotube wire can be arbitrarily set as desired. A diameter of the untwisted carbon nanotube wire is in a range from about 0.5 nanometers to about 100 micrometers.

Figure 7:
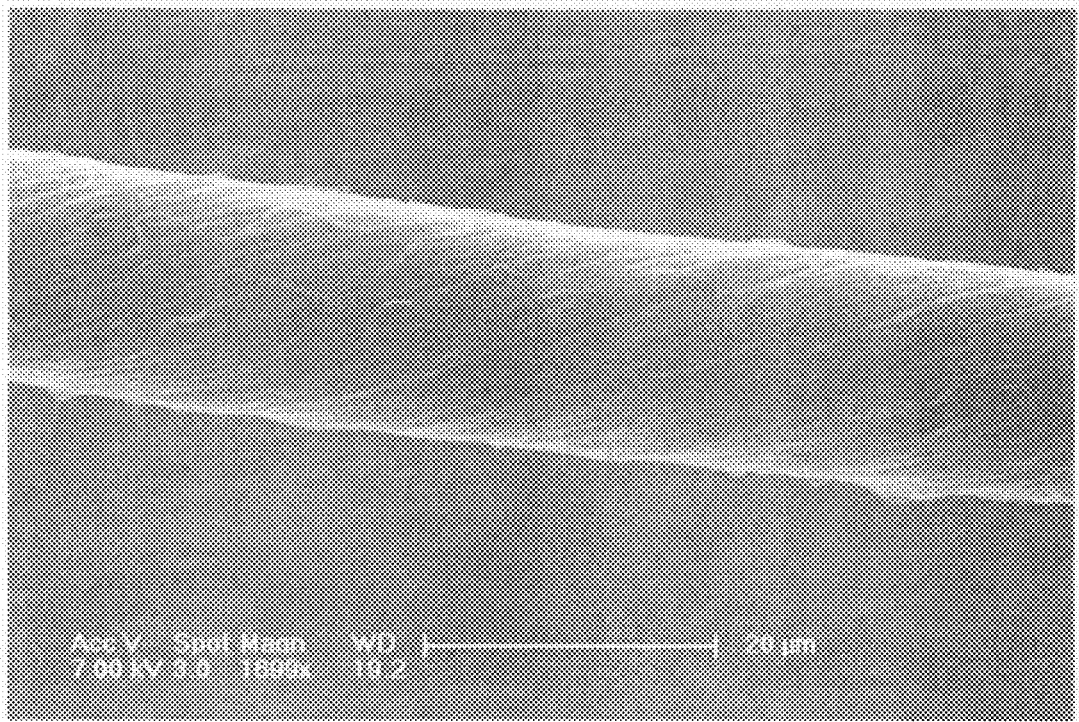
FIG. 7 is a Scanning Electron Microscope (SEM) image of a twisted carbon nanotube wire in accordance with the first embodiment.

The twisted carbon nanotube wire is formed by twisting a carbon nanotube film. In the examplarly embodiment, the twisted carbon nanotube wire is formed by using a mechanical force to turn the two ends of the carbon nanotube film in opposite directions. Referring to FIG. 7, a twisted carbon nanotube wire includes a plurality of carbon nanotubes oriented around an axial direction of the twisted carbon nanotube wire in a helix pattern.

Further, the twisted carbon nanotube wire can be treated with a volatile organic solvent. After being soaked is the organic solvent, the adjacent parallel carbon nanotubes in the twisted carbon nanotube wire will be bundled together, due to the surface tension of the organic solvent when the organic solvent vaporizes. As a result, the specific surface area of the twisted carbon nanotube wire will decrease. The density and the strength of the twisted carbon nanotube wire will be increased.

Referring to FIGS. 2, 3, the liquid crystal display 300 further includes a fixing layer. The fixing layer is located on the carbon nanotube structure and faces the liquid crystal layer. In the present embodiment, the first alignment layer 304 includes a first carbon nanotube structure 304a and a first fixing layer 304b; and the second alignment layer 324 includes a second carbon nanotube structure 324a and a second fixing layer 324b. Due to the first carbon nanotube structure 304a having a plurality of parallel and uniform gaps, when the first fixing layer 304b is formed on the first carbon nanotube structure 304a, the first grooves 308 are formed on surfaces of the first fixing layer 304b. Due to the second carbon nanotube structure 324a having a plurality of parallel and uniform gaps, when the second fixing layer 324b is formed on the second carbon nanotube structure 324a, the second grooves 328 are formed on surfaces of the second fixing layer 324b.

In order to fabricate first grooves 308 that are perpendicular to the second grooves 328, the arranged direction of the carbon nanotubes in the first alignment layer 304 are perpendicular to the arranged direction of the carbon nanotubes in the second alignment layer 324. For example, the carbon nanotubes in the first alignment layer 304 are each aligned parallel to an X-axis, and the carbon nanotubes in the second alignment layer 324 are each aligned parallel to a Z-axis. A thickness of each of the first alignment layer 304 and the second alignment layer 324 is in a range from about 1 micrometer to about 50 micrometers.

The fixing layers 304b, 324b can be made of the materials selected from the group consisting of diamond, silicon nitrogen, hydride of random silicon, silicon carbon, silicon dioxide, aluminum oxide, tin oxide, cerium oxide, zinc titanate, and indium titanate. The fixing layers 304b, 324b can be fabricated by evaporating, sputtering, or plasma enhanced chemical vapor deposition. Alternatively, the fixing layers 304b, 324b can be made of the materials selected from the group consisting of polyethylene ethanol, polyamide, polymethyl methacrylate, and polycarbonate. The fixing layers 304b, 324b are sprayed on the first carbon nanotube structure 304a and the second carbon nanotube structure 324a. A thickness of the fixing layers is in a range from about 20 nanometers to about 2 micrometers.

The first substrate 302 and the second substrate 322 can be made of materials selected from the group comprising of glass, quartz, diamond, and plastics. In the present embodiment, the first substrate 302 and the second substrate 322 are made of flexible materials, such as cellulose triacetate (CTA). According to user-specific needs, the first substrate 302 and the second substrate 322 can be made of different suitable.

The liquid crystal layer 338 includes a plurality of cigar-shaped liquid crystal molecules. The liquid crystal layer 338 can also be made of other liquid crystal materials, which are generally used in the present technology. Furthermore, a plurality of supporters (not shown) can be located between the first alignment layer 304 and the second alignment layer 324. The supporter can be a small ball made of polyethylene. A diameter of the ball ranges from about 1 to about 10 micrometers. In the present embodiment, the diameter of the ball is 5 micrometers.

The shape of the first electrode 306, the second electrode 307 and the third electrode 326 is arbitrary. In the present embodiment, each of the electrodes is strip-shaped. The first electrode 306 and the second electrode 307 are located in parallel and extend along a first direction. The first electrode 306 and the second electrode 307 are located on the surface of the first alignment layer 304 adjacent to the first substrate 302. The first electrode 306 and the second electrode 307 are located on the two opposite ends of the first substrate 302. The third electrode 326 is located on the surface of the second alignment layer 324 adjacent to the second substrate 322 and extends along a second direction. The first direction and the second direction intersect with each other. In present embodiment, the first direction is perpendicular with the second direction. Also, the electrodes 306, 307, 326 can be located on the surface of the alignment layer 304, 324 far away from the substrate 302, 322 or on the surface of the fixing layer 304b, 324b far away from the liquid crystal layer 338.

The first alignment layer 304 of the liquid crystal display 300 can be heated if needed as described below.

When the liquid crystal display 300 does not need to be heated, the third electrodes 326 is kept at zero, and the first electrode 306 and the second electrode 307 are controlled by information source to allow the liquid crystal display 300 work. When the liquid crystal display 300 needs to be heated, the second electrode 307, electrically connected to the first carbon nanotube structure 304a, is in any one of four states. In the first state the second electrode 307 pre-heats the liquid crystal display 300 before it operates, by applying a steady pre-determined amount of direct current to the first carbon nanotube structure 304a to heat the liquid crystal display 300 up to a predetermined temperature. The second electrode 307 enters the second state to keep the liquid crystal display 300 heated while it is in an "off" state, by applying direct current pulses to the first carbon nanotube structure 304a. In this state, a compensation voltage such as 2.5 V should be applied to the third electrode 326 to keep the liquid crystal display 300 in an "off" state. The second electrode 307 enters the third state when the liquid crystal display 300 is in transition between the "off" state and "on" state, and heats the display 300 by applying a high frequency alternating current to the first carbon nanotube structure 304a. Because the relaxation time of the liquid crystal display 300 between the "off" state and "on" state is a matter of microseconds, the frequency of the high frequency current should be above 10 kilohertz. While the display 300 is in the "on" state the second electrode 307 enters the fourth state and does not apply current.

Figure 8:
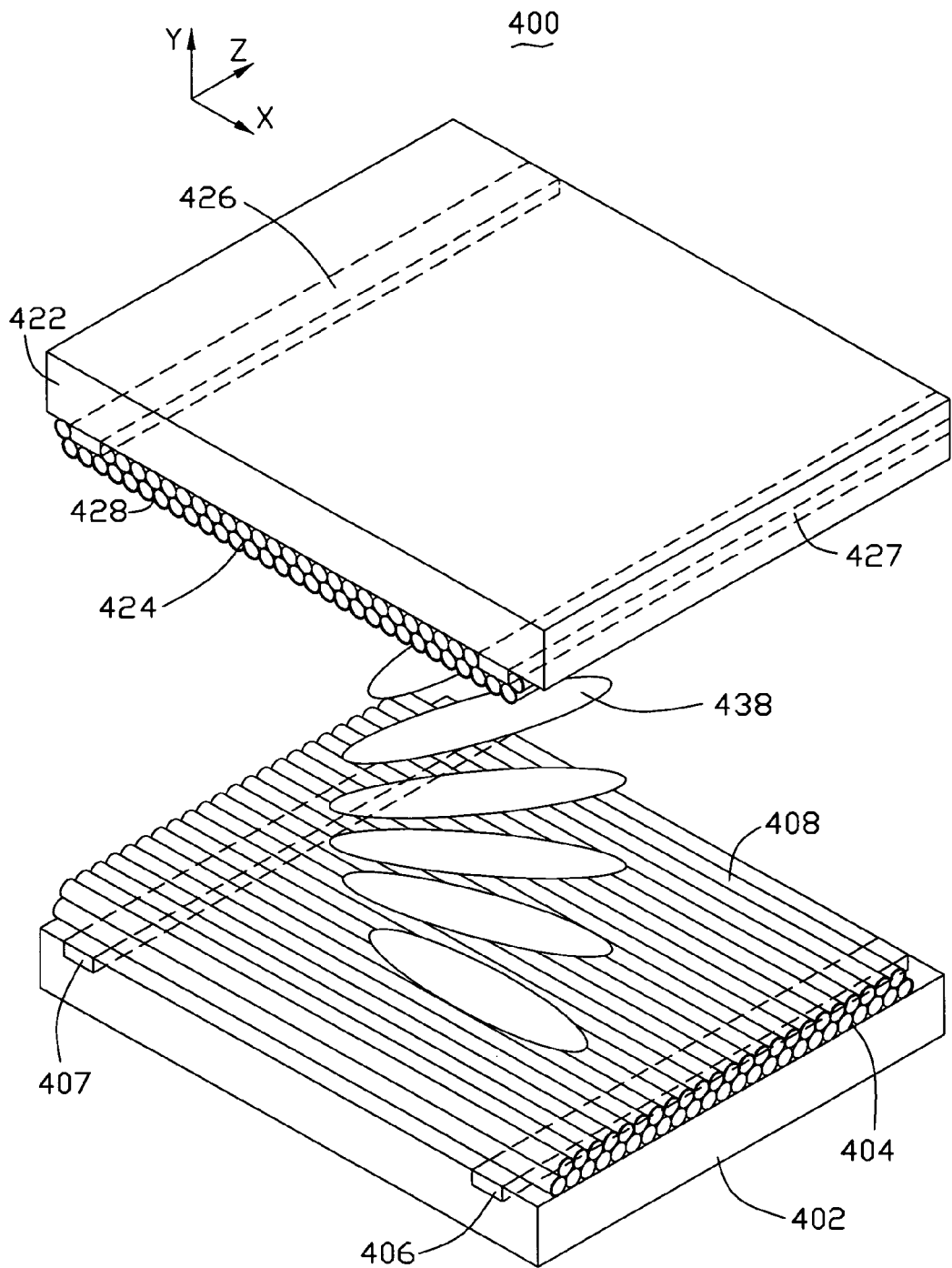
FIG. 8 is a schematic, isometric view of a liquid crystal display in accordance with a second embodiment.

Referring to FIG. 8, the liquid crystal display 400 in the second embodiment includes a first substrate 402, a first alignment layer 404, a liquid crystal layer 438, a second alignment layer 424, a second substrate 422, a first electrode 406, a second electrode 407, a third electrode 426. The liquid crystal display 400 in the second embodiment has a similar structure with the liquid crystal display 300 in the first embodiment. The difference between the liquid crystal display 400 and the liquid crystal display 300 is that the liquid crystal display 400 includes a fourth electrode 427 used to supply voltage to the carbon nanotube structure in the second alignment layer 424. The fourth electrode 427 and the third electrode 426 are located in parallel.

The alignment layer 404, 424 of the liquid crystal display 400 can be heated if needed as described below. While the liquid crystal display 400 does not need to be heated, the first electrodes 426, 427 are kept at zero, and the electrodes 406, 407 are controlled by information source to allow the liquid crystal display 400 work. While the liquid crystal display 400 needs to be heated, the heating process is similar with the heating process of the liquid crystal display 300. The difference is that a current is applied to the carbon nanotube structure in the both first alignment layer 404 and second alignment layer 424 at same time. In the present embodiment, because the voltage applied to the fourth electrode 427 can keep the liquid crystal display 400 in an "off" state, no additional compensation voltage should be applied to the third electrode 426.

When the liquid crystal display 400 needs to be heated, the second electrode 407, electrically connected to the first carbon nanotube structure, is in any one of four states. In the first state the second electrode 407 pre-heats the liquid crystal display 400 before it operates, by applying a steady pre-determined amount of direct current to the carbon nanotube structure in the first alignment layer 404 to heat the liquid crystal display 400 up to a predetermined temperature. In this state, a voltage, such as 5 V, is applied to the fourth electrode 427 to apply a steady pre-determined amount of direct current to the carbon nanotube structure in the second alignment layer 424 to heat the liquid crystal display 400. The second electrode 407 enters the second state to keep the liquid crystal display 400 heated while it is in an "off" state, by applying direct current pulses to the carbon nanotube structure in the first alignment layer 404. In this state, a voltage such as 5 V is applied to the fourth electrode 427 to apply a steady pre-determined amount of direct current to the carbon nanotube structure in the second alignment layer 424 to heat the liquid crystal display 400 and no additional compensation voltage should be applied to the third electrode 426. The second electrode 407 enters the third state when the liquid crystal display 400 is in transition between the "off" state and "on" state, and heats the display 400 by applying a high frequency current to the carbon nanotube structure in the alignment layer 404, 424. Because the relaxation time of the liquid crystal display 400 between the "off" state and "on" state is a matter of microseconds, the frequency of the high frequency current should be above 10 kilohertz. While the display 400 is in the "on" state the second electrode 407 enters the fourth state and does not apply current.

Due to the carbon nanotube having excellent conductive properties, thermal stability, high thermal radiation efficiency and large specific surface area, the carbon nanotube structure of the present embodiment can served as a perfect black body. The thermal response speed of the carbon nanotube structure is high due to its small heat capacity of per unit area which less than $1.7\times10^{-6}$ J/(CM$^2$·K). A carbon nanotube film with a thickness of about 1 micrometer to about 1 millimeter can reach its highest surface temperature within 1 second. A drawing carbon nanotube film can reach its highest surface temperature within 0.1 milliseconds.

Because the carbon nanotubes provide each carbon nanotube structure with good electrical conductivity, each carbon nanotube structure can be used to conduct electricity and thereby replace a conventional transparent electrode layer. Specifically, the carbon nanotube structure can act as both an alignment layer and an electrode layer. This simplifies the structure and reduces the thickness of the liquid crystal display, thereby enhancing the efficiency of usage of an associated backlight while retaining all functionality. Additionally, it forms a plurality of parallel gaps in carbon nanotube structure without the use of mechanical treatments (such as rubbing the carbon nanotube film). Thus, the conventional art problem of electrostatic charge and dust contamination can be avoided, while the corresponding alignment layers have improved alignment quality.

Moreover, by covering a fixing layer on the carbon nanotube structure, this prevents the carbon nanotube structure of the alignment layer from falling off when the carbon nanotube structure is in contact with the liquid crystal layer. Therefore, the liquid crystal display has improved durability and an excellent arrangement of liquid crystal molecules.

Because the carbon nanotubes in each carbon nanotube structure are arranged in parallel, the carbon nanotube structure has a light polarization characteristic, and as a result, can be used to replace a conventional polarizer. However, at least one polarizer can be located on a surface of the first substrate that faces away from the liquid crystal layer, and/or on a surface of the second substrate that faces away from the liquid crystal layer.

The liquid crystal display provided in the present embodiment is a single-pixel liquid crystal display. By arranging a number of the liquid crystal displays in a predetermined fashion, a multi-pixel liquid crystal display could be obtained. The multi-pixel liquid crystal display could have the same or different substrate.

The liquid crystal display in the present embodiment has the many advantages including the following. Firstly, the carbon nanotube structure can be used as a heating layer, thus the liquid crystal display can perform at low external temperatures. Secondly, the carbon nanotube structure can be used as a heating layer and an alignment layer at the same time, thus simplify the structure of the liquid crystal display and reduce the thickness of the liquid crystal display. Thirdly, the carbon nanotube structure can act as both an alignment layer and an electrode layer, thus further simplify the structure of the liquid crystal display and reduce the thickness of the liquid crystal display. Therefore, the liquid crystal display has improved durability and improved arrangement of liquid crystal molecules.

Finally, it is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A liquid crystal display comprising:
    a first substrate;
    a second substrate;
    a liquid crystal layer located between the first substrate and the second substrate;
    a first alignment layer located on a surface of the first substrate, the first alignment layer comprising a first carbon nanotube structure;
    a second alignment layer located on the second substrate; and
    a first electrode and a second electrode, and the first electrode and the second electrode are electrically connected to the first carbon nanotube structure.

2. The liquid crystal display as claimed in claim 1, wherein the first carbon nanotube structure comprises a plurality of carbon nanotubes arranged along the same direction.

3. The liquid crystal display as claimed in claim 1, wherein the first carbon nanotube structure comprises at least one carbon nanotube film comprising a plurality of carbon nanotubes parallel to each other.

4. The liquid crystal display as claimed in claim 3, wherein the first carbon nanotube structure comprises at least two stacked carbon nanotube films, and an angle between the aligned directions of the carbon nanotubes in adjacent carbon nanotube layers is equal to approximately 0 degrees.

5. The liquid crystal display as claimed in claim 3, wherein the carbon nanotube film comprises a plurality of successively oriented carbon nanotube segments joined end-to-end by van der Waals attractive force therebetween.

6. The liquid crystal display as claimed in claim 5, wherein each carbon nanotube segment comprises of a plurality of carbon nanotubes, the carbon nanotubes have a substantial same length, and adjacent carbon nanotubes are attracted by van der Waals attractive force therebetween.

7. The liquid crystal display as claimed in claim 3, wherein a plurality of gaps are defined between the carbon nanotubes.

8. The liquid crystal display as claimed in claim 1, wherein the first carbon nanotube structure comprises a plurality of carbon nanotube wires, and the carbon nanotube wires are located in parallel to each other.

9. The liquid crystal display as claimed in claim 8, wherein each carbon nanotube wire comprises a plurality carbon nanotubes joined end-to-end by van der Waals attractive force.

10. The liquid crystal display as claimed in claim 8, wherein the carbon nanotube wire is twisted.

11. The liquid crystal display as claimed in claim 8, wherein a plurality of gaps are defined between the carbon nanotube wires.

12. The liquid crystal display as claimed in claim 1, wherein the first electrode and the second electrode are located on the surface of the first substrate, and the first electrode and the second electrode are located in parallel and extend along a first direction.

13. The liquid crystal display as claimed in claim 12, wherein the second alignment layer comprises a second carbon nanotube structure.

14. The liquid crystal display as claimed in claim 13, further comprising a third electrode, the third electrode is electrically connected to the second carbon nanotube structure, and the third electrode is located on the surface of the second substrate and extends along a second direction.

15. The liquid crystal display as claimed in claim 14, further comprising a fourth electrode, the fourth electrode is electrically connected to the second carbon nanotube structure, and the fourth electrode is located on the surface of the second substrate and parallel to the third electrode.

16. The liquid crystal display as claimed in claim 14, wherein the first direction crosses the second direction.

17. The liquid crystal display as claimed in claim 16, wherein the first direction is perpendicular to the second direction.

18. The liquid crystal display as claimed in claim 1, wherein the first alignment layer further comprises a fixing layer on the first carbon nanotube structure.

19. The liquid crystal display as claimed in claim 18, wherein the material of the fixing layer is comprises of a material that is selected from the group consisting of diamond, silicon nitrogen, hydride of random silicon, silicon carbon, silicon dioxide, aluminum oxide, tin oxide, cerium oxide, zinc titanate, and indium titanate, polyethylene ethanol, polyamide, polymethyl methacrylate, and polycarbonate.

20. The liquid crystal display as claimed in claim 1, further comprising at least one polarizer located on surface of the first substrate, at least one polarizer located on the second substrate or at least one polarizer located on both the first and second substrate.

* * * * *